(12) United States Patent
Arrien

(10) Patent No.: US 9,346,145 B2
(45) Date of Patent: May 24, 2016

(54) APPARATUS AND METHOD FOR BLENDING ADDED MATERIAL WITH BASE MATERIAL ON A MANUFACTURED COMPONENT

(71) Applicant: AV&R Vision and Robotics inc., Montreal (CA)

(72) Inventor: Francois-Imran Arrien, Laval (CA)

(73) Assignee: AV & R Vision and Robotics Inc, Quebec (CA)

( * ) Notice: Subject to any disclaimer, the term of this patent is extended or adjusted under 35 U.S.C. 154(b) by 370 days.

(21) Appl. No.: 13/889,396

(22) Filed: May 8, 2013

(65) Prior Publication Data

US 2014/0295736 A1    Oct. 2, 2014

Related U.S. Application Data

(60) Provisional application No. 61/805,738, filed on Mar. 27, 2013.

(51) Int. Cl.
| | |
|---|---|
| *B24B 21/16* | (2006.01) |
| *B24B 49/00* | (2012.01) |
| *B24B 23/06* | (2006.01) |
| *B24B 19/14* | (2006.01) |
| *B24B 21/18* | (2006.01) |
| *B23P 6/00* | (2006.01) |

(52) U.S. Cl.
CPC .............. *B24B 21/165* (2013.01); *B23P 6/007* (2013.01); *B24B 19/14* (2013.01); *B24B 21/18* (2013.01)

(58) Field of Classification Search
CPC . Y10T 29/49318; F01D 5/005; B24B 21/165; B24B 19/14; B24B 21/18; B23P 6/007
See application file for complete search history.

(56) References Cited

U.S. PATENT DOCUMENTS

| | | | |
|---|---|---|---|
| 3,528,000 A | 9/1970 | Allen et al. | |
| 5,092,942 A * | 3/1992 | Fraser et al. | 148/529 |
| 5,645,466 A * | 7/1997 | Wikle | 451/5 |
| 7,032,279 B2 * | 4/2006 | McCarvill et al. | 29/90.01 |
| 8,918,995 B2 * | 12/2014 | Milleville | 29/889.1 |
| 2002/0161483 A1 * | 10/2002 | Vaidyanathan | 700/275 |
| 2010/0095526 A1 * | 4/2010 | Derrien et al. | 29/889.1 |
| 2011/0099809 A1 * | 5/2011 | Hovel et al. | 29/888 |
| 2011/0099810 A1 * | 5/2011 | Stankowski et al. | 29/888 |
| 2011/0264413 A1 * | 10/2011 | Stankowski et al. | 703/1 |

(Continued)

FOREIGN PATENT DOCUMENTS

| | | |
|---|---|---|
| EP | 1038632 A2 | 9/2000 |
| EP | 1410873 A2 | 4/2004 |

*Primary Examiner* — Joseph J Hail
*Assistant Examiner* — Marc Carlson

(57) ABSTRACT

The present relates to an apparatus and method for blending added material with base material on manufactured components. The apparatus comprises an abrasive device having an abrasive surface for removing exceeding added material, and a guide fixed to the abrasive device. The method determines a trajectory of the abrasive surface with respect to a manufactured component: determines which of a plurality of contact points of the guide shall be in contact with the manufactured component along the trajectory; actuates the abrasive device; and controls position and angle of the abrasive surface en the manufactured component along the trajectory, while keeping the determined contact point in contact with the manufactured component. A force is applied to the abrasive device when the abrasive surface is in contact with the manufactured component and transferred when the guide gets in contact with the base material.

11 Claims, 20 Drawing Sheets

(56) References Cited

U.S. PATENT DOCUMENTS

| | | | |
|---|---|---|---|
| 2012/0077417 A1* | 3/2012 | Derrien et al. | 451/5 |
| 2012/0198676 A1* | 8/2012 | Rickenbacher et al. | 29/402.13 |
| 2012/0222306 A1* | 9/2012 | Mittendorf et al. | 29/889.1 |
| 2014/0259666 A1* | 9/2014 | Baughman et al. | 29/889.1 |

* cited by examiner

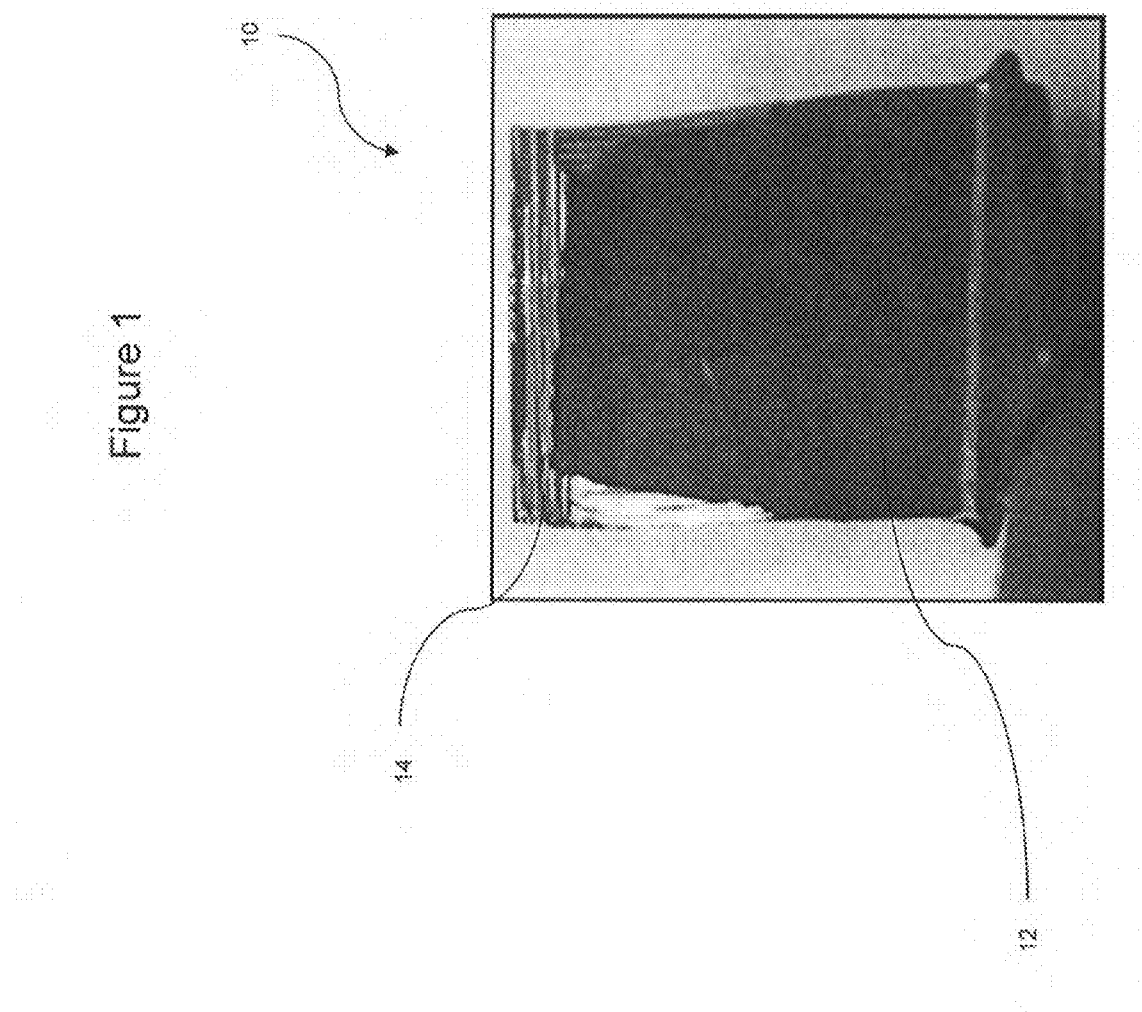

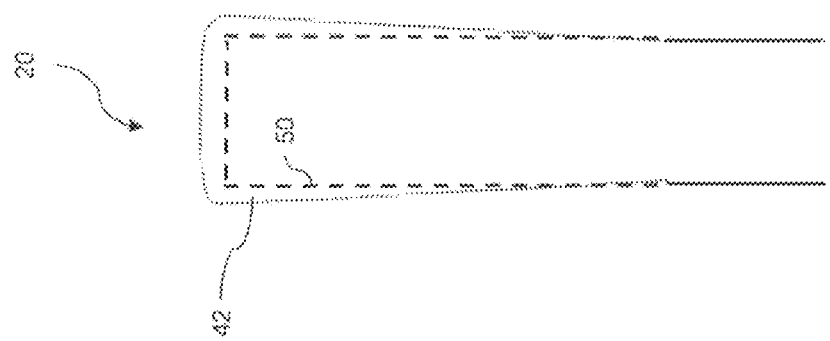
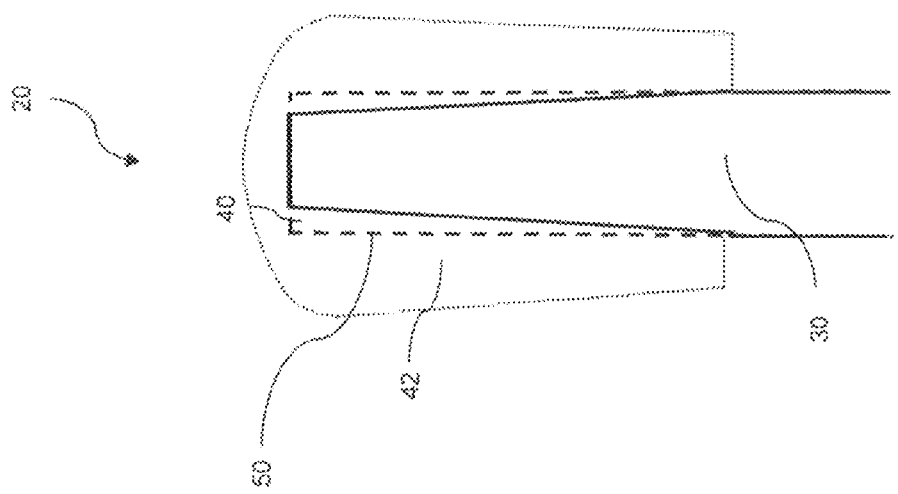
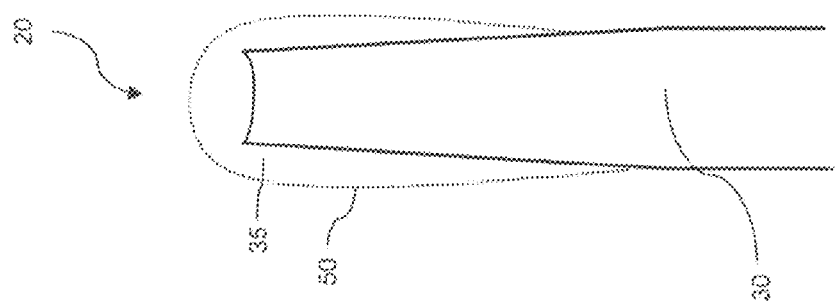

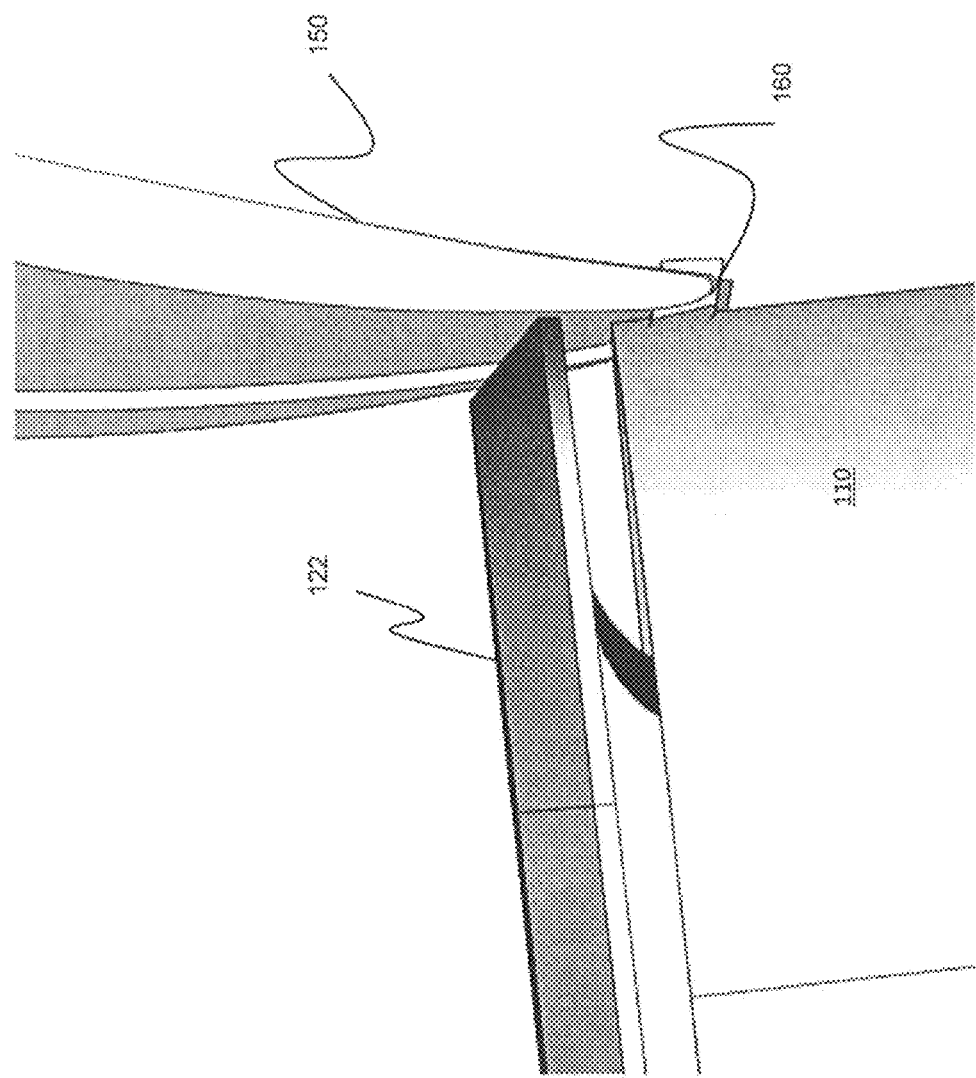

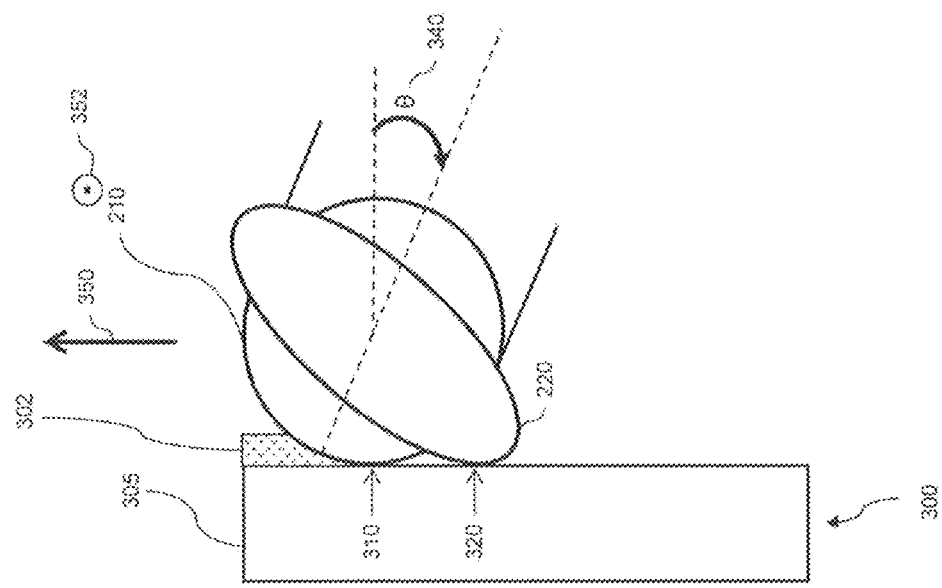

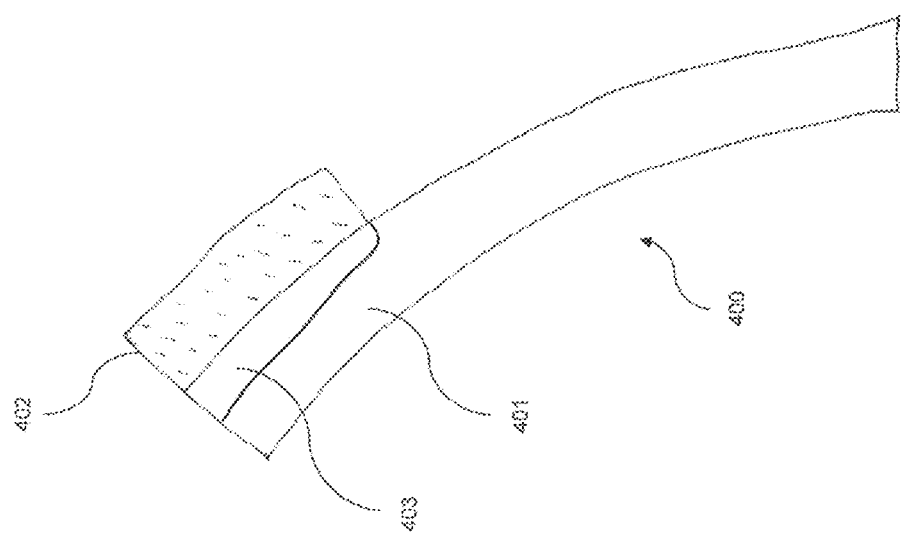

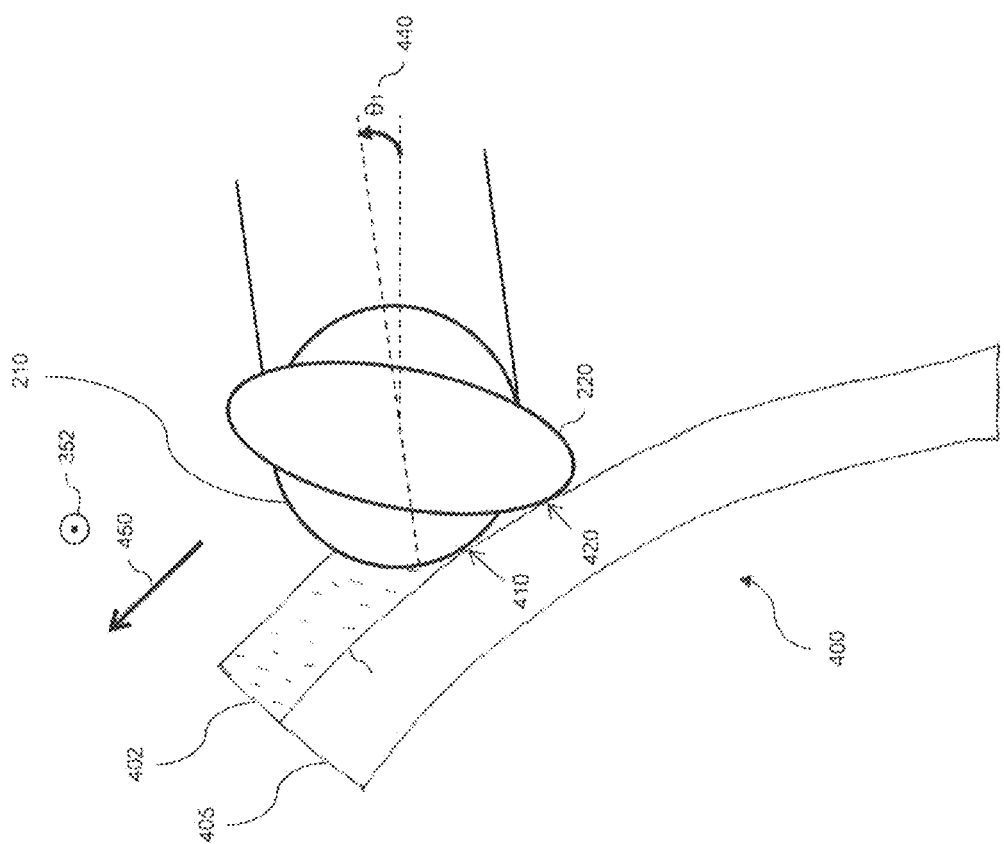

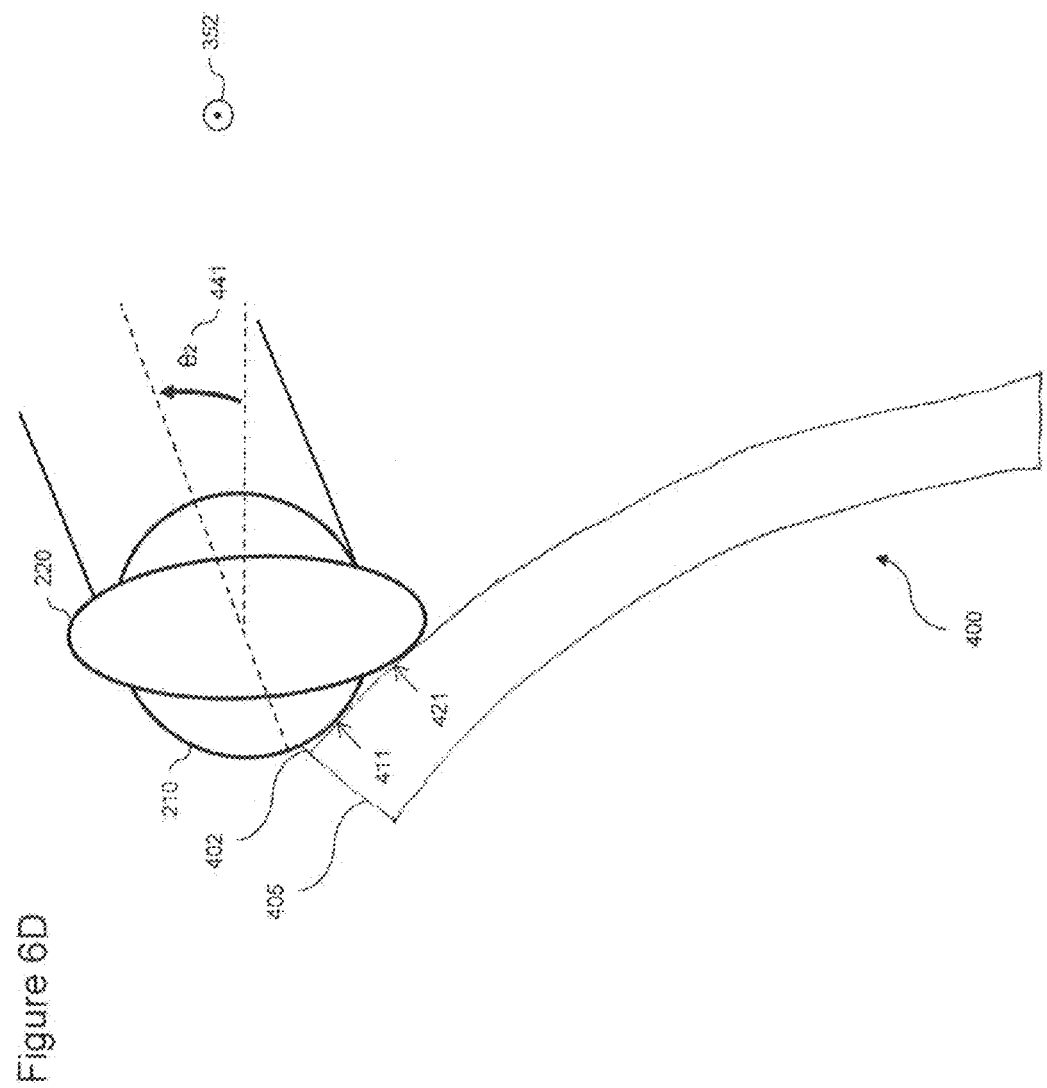

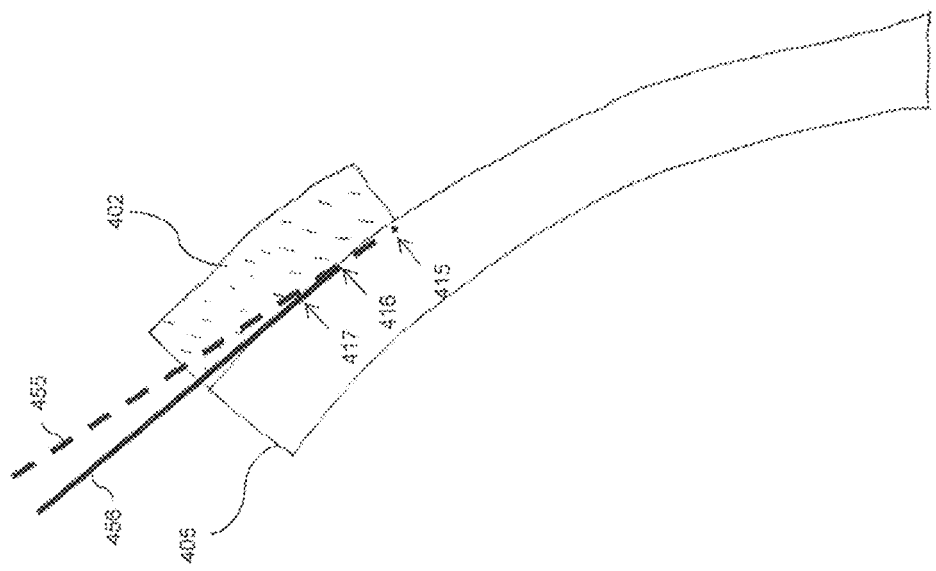
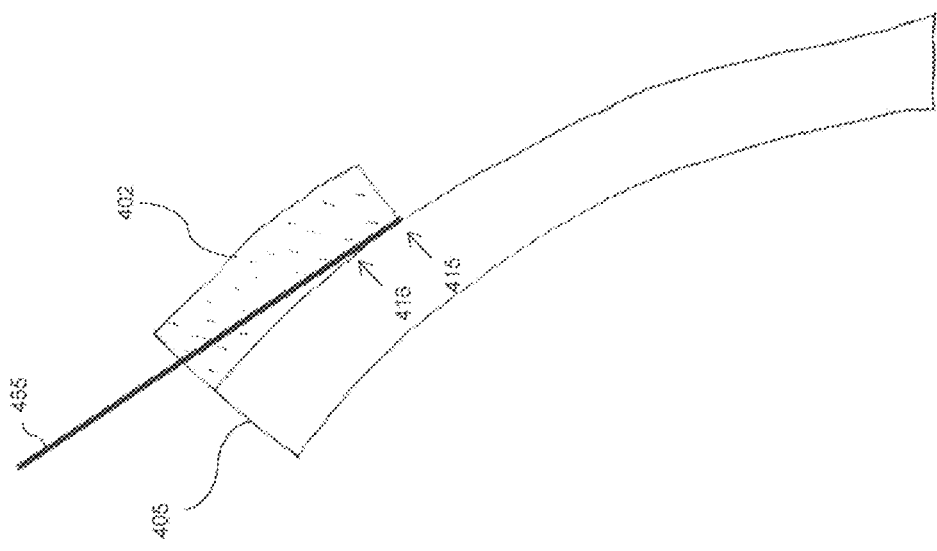

APPARATUS AND METHOD FOR BLENDING ADDED MATERIAL WITH BASE MATERIAL ON A MANUFACTURED COMPONENT

TECHNICAL FIELD

The present disclosure relates to the field of automated manufacturing. More specifically, the present disclosure relates to an apparatus and method for blending added material with base material on a manufactured component.

BACKGROUND

Blending is an automated manufacturing process used in the refurbishing of a manufactured component. The manufactured component is made of a base material. Because of wear, part of the base material is lacking and the actual profile of the manufactured component is different from its nominal profile. Refurbishing of the manufactured component may require sometimes the removal of old material, before consists adding new material (e.g. vila welding), to recreate the nominal profile of the manufactured component. In general, too much new material is added. Thus, the manufactured component needs to be further processed to eliminate the added new material in excess, for blending the added new material with the base material.

Blades are an example of manufactured components which may need to foe refurbished, via an addition of new material (e.g. via welding), followed by a blending process. Blades are used mostly in turbine applications as in the aeronautic industry and the energy industry, and are critical components for these industries. Thus, very strict requirements (e.g. dimensions, shape) are applied to the profile of a blade, like for example the shape of an edge of the blade. Finishing operations, performed by dedicated finishing fools, are usually necessary to obtain the final profile, of the blade, in accordance with the strict requirements. Such finishing operations include the blending of added material with base material on the blade.

A finishing tool used for the blending proems comprises an abrasive device (e.g. a sand belt) with an abrasive surface, for removing added material in excess from the manufacture) component. The finishing tool may be operated by a human, or may be automatically controlled. However, in both cases, the precision of the blending process may not be sufficient to comply with nominal specifications of the finished manufactured component (e.g., the final profile of the component after performing the blending operation is not compliant with the nominal specifications). For example, too much material may have been removed by the abrasive device from a portion of the manufactured component (base material has been removed during the blending process), and/or net enough material may have been removed by the abrasive device from another portion of the manufactured component (added material in excess has not been removed during the blending process). Thus, the lack of precision in the blending process is generally due to a lack of precision in the control of the abrasive device.

Therefore, there is a need for an apparatus and a method for blending added material with base material on a manufactured component, which overcomes the aforementioned limitations.

SUMMARY

According to a first aspect, the present disclosure provides an apparatus for blending added material with base material on a manufactured component. The apparatus comprises an abrasive device having an abrasive surface, for removing exceeding added material and for blending the added material with the base material. The abrasive surface performs in operation an abrasive motion. The apparatus further comprises a guide fixed to the abrasive device. The guide provides a plurality of contact points exceeding at least a portion of the abrasive surface. The apparatus also comprises a positioning mechanism for controlling position and angle of the abrasive surface and the guide with respect to the manufactured component. The positioning mechanism guides in operation the abrasive surface along an abrasion direction, white using at least we of the plurality of contact points of the guide as a reference when in contact with the manufactured component According to a second aspect, the present disclosure provides a method for blending added material with base material on a manufactured component. The method comprises determining a trajectory of an abrasive surface of an abrasive device with respect to the manufactured component The method also comprises determining which of a plurality of contact points of a guide is to be kept in contact with the manufactured component along the trajectory. The method further comprises actuating the abrasive device. And the method comprises controlling position and angle of the abrasive surface on the manufactured component along the trajectory, while using at least one of the plurality of contact points of the guide as a reference when in contact with the manufactured component.

According to an aspect, the present method and apparatus keep the determined contact point in contact with the manufactured component aft of the trajectory.

According to an aspect a section of a perimeter of the guide exceeding the abrasive surface has one of the following shapes: elliptical, parabolic or any curvilinear shape.

According to an aspect, the abrasive motion is opposite to the abrasion direction.

According to an aspect, the manufactured component is moved with respect to the abrasive device in the abrasion direction.

According to an aspect, a force is applied to the abrasive device when the device is in contact with the manufactured component to allow the abrasive surface to remove the exceeding added material. The force is transferred from the abrasive device to the guide when the abrasive surface is at a required position with respect to the base material to prevent the abrasive surface from removing the base material.

According to an aspect, the force applied to the abrasive device is measured and controlled in closed loop to respect a predetermined value.

According to an aspect, operational parameters are taken info consideration for controlling the position and angle of the abrasive surface, the operational parameters including a wear of the abrasive surface, and specific characteristics of the manufactured component.

According to an aspect, the trajectory of the abrasive surface with respect to the manufactured component is calculated by processing a 3D model of the manufactured component and an actual position of the manufactured component with respect to the abrasive device, the 3D model comprising a representation of the added material and the base material.

BRIEF DESCRIPTION OF THE DRAWINGS

Embodiments of the disclosure wilt toe described by way of example only with reference to the accompanying drawings, in which:

FIG. 1 illustrates a front view of a manufactured component with base material and added material, according to a non-restrictive illustrative embodiment;

FIGS. 2A-C illustrate a sectional view of a manufactured component subjected to a refurbishing operation, according to non-restrictive illustrative embodiments;

FIGS. 4A-C illustrate an abrasive device with an abrasive surface and a guide for blending added material with base material on a manufactured component, according to a non-restrictive illustrative embodiment;

FIGS. 5A-D illustrate a blending operation of a manufactured component with a linear profile, according to a non-restrictive illustrative embodiment;

FIGS. 6A-D illustrate a blending operation of a manufactured component with a convex profile according to a non-restrictive illustrative embodiment;

FIGS. 7A-B illustrate two iterations of a blending operation, according to a non-restrictive illustrative embodiment;

DETAILED DESCRIPTION

Figure 3:
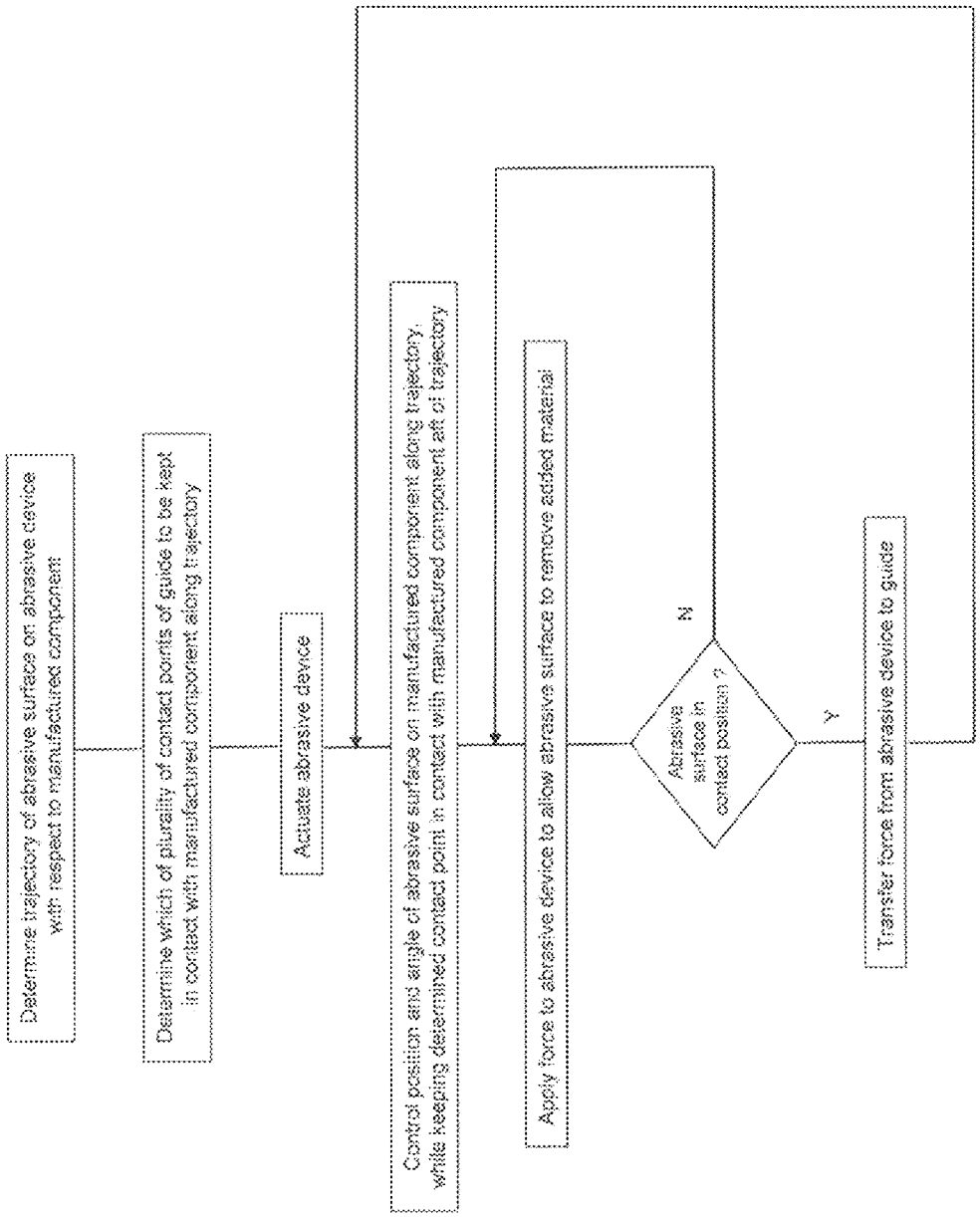
FIG. 3 illustrates a method for blending added material with base material on a manufactured component, according to a non-restrictive illustrative embodiment.

The foregoing and other features will become more apparent upon reading of the following non-restrictive description of illustrative embodiments thereof, given by way of example only with reference to the accompanying drawings. Like numerals represent like features on the various drawings.

The present disclosure relates to an apparatus and method for blending added material with base material of a manufactured component.

Terminology

The following terminology is used throughout the present disclosure.

Base material: material present on a manufactured component before addition of material for repair-purpose.

Added material: material added on the manufactured component to compensate a lack of base material.

Added material in excess/exceeding added material: portion of the added material which shall be removed from the manufactured component, to make the manufactured component compliant with a nominal profile.

Nominal profile: profile of the manufactured component when compliant with the corresponding specifications.

Actual/final profile: physical profile of the manufactured component at different stages of manufacturing process.

Blending of Added Material with Base Material

FIG. 1 illustrates a front view of a manufactured component 10 which has been refurbished, by removing some of the old material before adding material to restore its edges. The component 10 comprises base material 12 present before the refurbishing process. The component 10 also comprises added material 14, added to the edges during the refurbishing process. In general, too much added material 14 is added. Thus, the added material 14 is banned with the base material 12, by removing the added material 14 in excess. At the end of the blending operation, the profile of the manufactured component 10 is compliant with its nominal profile within set tolerances. The degree of compliance and time required to perform the ending is dependant en the precision of the blending operation.

Referring now to FIGS. 2A, 2B and 2C concurrently a sectional view of simplified exemplary manufactured component 20 subjected to a refurbishing operation are represented. FIG. 2A represents a first profile of the manufactured component 20, comprising base material 30. In the first profile, some missing base material 35 is lacking with respect to a nominal profile 50 of the manufactured component 20. Thus, some material is added to the first profile, to make it compliant with the nominal profile 50. Depending on the type of manufactured component, damage to be repaired, etc., the base material 30 may further be modified before adding material, so as to ensure that the added material has enough thickness and/or adherence to the base material to result in a refurbished manufactured component 20 within tolerances set by corresponding specifications.

FIG. 2B represents a second exemplary profile of the manufactured component 20, after addition of some material 42 to the manufactured component. The second profile comprises the base material 30, added material 40 corresponding to a nominal profile 50 of the manufactured component, and added material in excess 42. In order to make the profile compliant with the nominal profile 50, the added material in excess 42 must be removed.

FIG. 2C represents a third exemplary profile of the manufactured component 20. As illustrated, the profile is not compliant with the nominal profile 50, because some added material in excess 42 which has not been removed. This is generally due to a lack of precision in the control of the abrasive device used for removing the added material in excess 42. For instance, the lack of precision consists in a lack of precision in the position of the abrasive device with respect to the manufactured component, and/or a lack of precision in the pressure applied to the abrasive device for removing material. Esther not enough material is removed, or too much material is removed by the abrasive device.

The apparatus and method described in the present disclosure allow a blending of added material with the base material 30 of the manufactured component 20, by precisely controlling the process of removing the added material in excess 42, so as to as closely as possible reach the nominal profile of the manufactured component after its refurbishing.

Figure 4A:
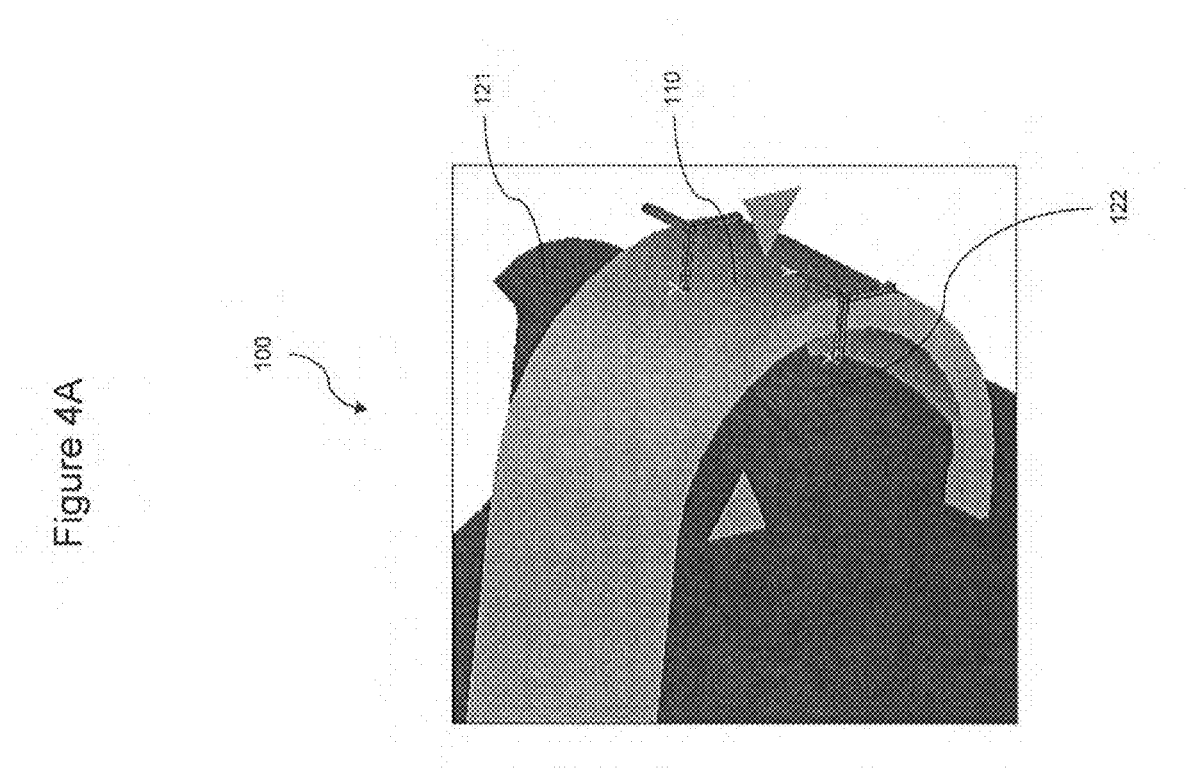
Figure 4B:
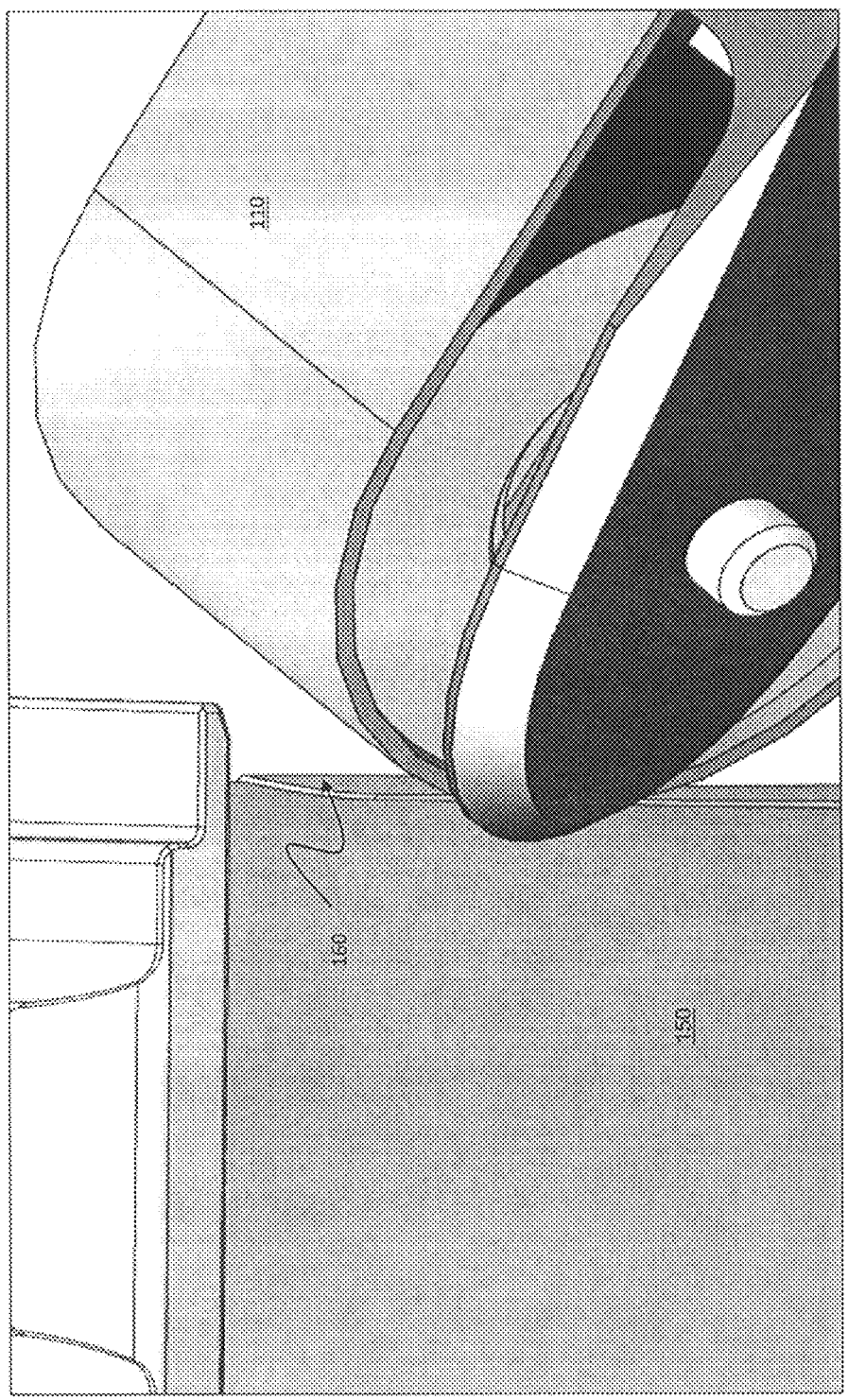

Now referring to FIGS. 4A-C concurrently, an apparatus for blending added material with base material on a manufactured component will be described.

The apparatus comprises an abrasive device having an abrasive surface for removing exceeding added material and blending the added material with the base material. While in operation, the abrasive surface performs an abrasive motion for removing the exceeding added material in contact with the abrasive surface. An abrasive device 100 is illustrated in FIG. 4A. The abrasive device too comprises an abrasive surface 110. FIG. 4B illustrates the abrasive surface 110 performing an abrasive motion 115 for removing exceeding added material of a manufactured component 150 in contact with the abrasive surface 110. The abrasive device 100 could be a sanding belt, a rotary sanding or polishing device, or any other known device which may be used to blend added material with base material on a manufactured component.

The apparatus also comprises a guide 121 fixed to the abrasive device 100 and providing a plurality of contact points exceeding at least a portion of the abrasive surface. FIG. 4A illustrates two guides 121 and 122 fixed on each side of the abrasive surface 110 of the abrasive device 100, the guides 121 and 122 each providing a plurality of contact points exceeding at least a portion of the abrasive surface 110. The abrasive device 100 could be equipped with one or several guides 121 and 122 each providing lateral overextending sections, depending on a range, of movement of the abrasive device 100 with respect to the manufactured component, or vice-versa. FIG. 4C further illustrates the guide 122 providing a plurality of contact points along its periphery exceeding at least a portion of the abrasive surface 110. The guides 121 and 122 may have identical shapes, or may have different complementary shapes. For example, one of the guides 121 and 122 may correspond to a section of an ellipse, a parabolic or a curvilinear shape, white the over overextending portion may define, a series of consecutive teeth or steps. Alternatively, the guides 121 and 122 may be identical and positioned similarly on each side of the abrasive surface 110.

As the manufactured component to be refurbished may vary in sizes and shapes, it is preferable that the guides 121 and 122 define a perimeter which varies along its extension with respect to the abrasive surface 110. For example, the abrasive surface 110 could define a half circle, while the guide corresponds to a portion of an ellipse or a paranoia. The ellipse is particularly interesting as it is simple mathematically angle calculation to identify an angle of action with respect to the abrasive surface and the manufactured component. Furthermore, as the nominal profile of the manufacture component is not limited to being linear, but could include concave and/or convex shapes, guides in shape of a quadrant of an ellipse are particularly well suited for providing, precision while keeping mathematical measurement of the point of contact on the guide simpler. However, other varying shapes are also included, and could be used, by adapting correspondingly the mathematical equations determining the point of contact of the guide with the manufactured component.

The apparatus further comprises a positioning mechanism (discussed further) for controlling position and angle of the abrasive surface 110 and the guide with respect to the manufactured component. In operation, the positioning mechanism guides the abrasive surface along an abrasion direction while maintaining at least one of the plurality of contact points of the guide in contact with the manufactured component. Depending on the applications, the positioning mechanism may keep one point of contact of the guide in contact with the manufactured component aft of the abrasive surface 110. In another embodiment the positioning mechanism may maintain one point of contest of the guide with the manufactured component forward or next to the abrasive surface 110. Alternatively, in certain applications, one point of contact of each of the two guides 121 and 122 may be maintained in contact with the manufactured component. Thus, depending on the size of the abrasive surface 110, the size and shape of the nominal profile of the manufactured component, and the position and shape of the guides 121 and 122, it is possible to identify at least one point of contact to be used on one of the guides 122 and 122, so as to procure high precision blending of the added material without affecting the base material, but rather using the material of the manufactured component which corresponds to the nominal profile with a contact point on one of the guides as a reference point.

Referring to FIGS. 5A-D concurrently, the control of the position and angle of the abrasive surface and the guide with respect to the manufactured component is illustrated.

Figure 5A:
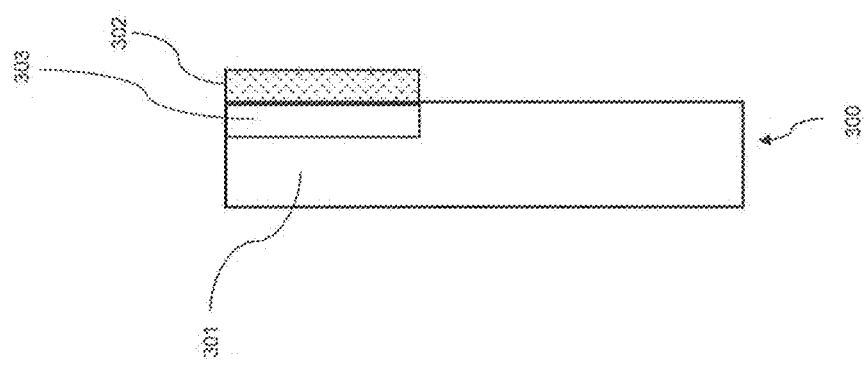

FIG. 5A represents a cross-section view of a manufactured component 300, comprising base material 301, added material 303, and exceeding added material 302. The exceeding added material 302 must removed be as if exceeds from the nominal profile of the manufactured component 300, and the added material 303 blended with the base material 301 to ensure a smooth and seamless finish.

Figure 5B:
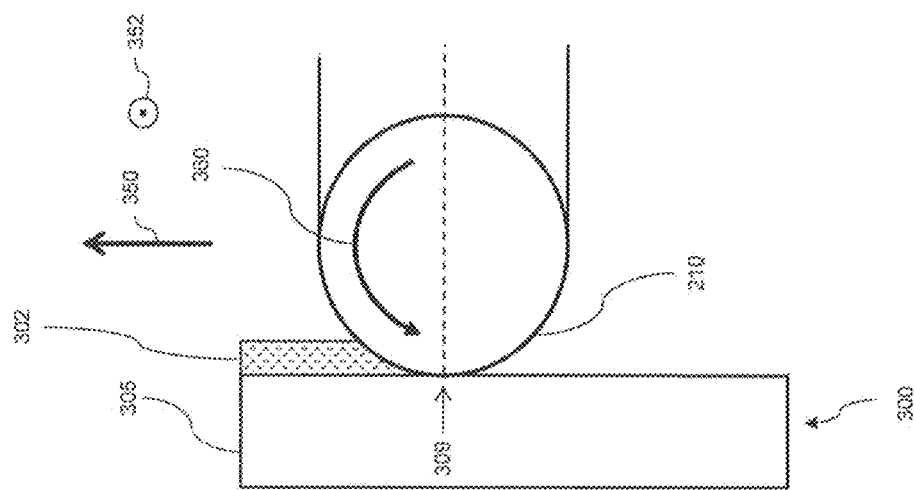

FIG. 5B represents a cross-section view of the manufactured component 300 and an abrasive surface 210. An abrasive device comprising the abrasive surface 210 is not represented for simplification purposes. A guide is not fixed to the abrasive device. The manufactured component 300 comprises the exceeding added material 302 and base material 305. The base material 305 of FIG. 5B comprises the base material 301 and the added material 303 blended with the base material 301 represented in FIG. 5A. The abrasive surface 210 removes the exceeding added material 302, without removing the base material 305. For this purpose, the abrasive surface 210 performs an abrasive motion 360 for removing the exceeding material 302. And the position of the abrasive surface 210 with respect to the manufactured component 300 follows an abrasion direction 350 for removing the totality of the exceeding added material 302. To provide a high precision blending and removal of all the exceeding added material 302, the abrasive surface 210 performs an abrasive motion 360. The abrasive surface 210 may move in a vertical movement 350 with respect to the manufactured component 300, or in a horizontal movement 352 (normal to the Figure). However as can be appreciated by those skilled in the art precision of such an abrasive surface 210 is very difficult to achieve, as the abrasive device moves along to remove the exceeding added material 302.

Figure 5C:
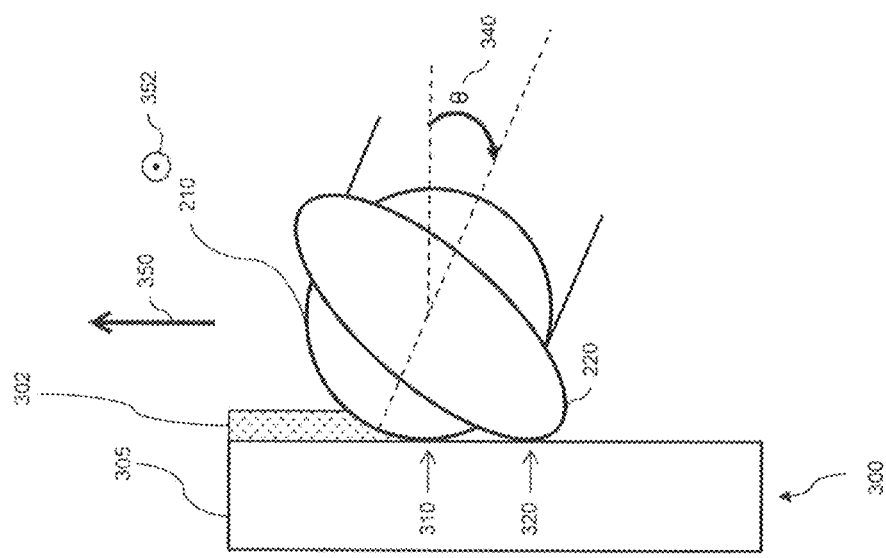

FIG. 5C represents a cross-section view of the manufactured component 300, the abrasive surface 210 and a guide 220. The guide 220 is fixed to the abrasive device (not represented in FIG. 5C). A positioning mechanism (not represented in FIG. 5C) controls the position and angle 340 of the abrasive surface 210 and the guide 220 with respect to the manufactured component 300. In operation, the positioning mechanism guides the abrasive surface 210 along the abrasion direction 350 or 352 while maintaining a contact point 320 of the guide 220 either aft (for direction 350) or forward or parallel (for direction 352) of the abrasion direction 350 and in contact with the base material of manufactured component 300. A specific angle 340 of the of the abrasive surface 210 and the guide 220 with respect to the manufactured component 300 as illustrated in FIG. 5C is different from an angle of the of the abrasive surface 210 without the guide 220 with respect to the manufactured component. The angle 340 is calculated so as to ensure that one point the guide 220 remains in contact win the base material of the manufacture component 300, white the abrasive surface 210 removes the added exceeding material 302, without removing the base material and the added material corresponding to the nominal profile of the manufactured component. Although FIG. 5C depicts a straight cross-section of the manufactured component, those skilled in the art will understand that the cross-section of the manufactured component may include concave or convex shapes and surfaces. For a non-straight cross-section of the manufactured component, the angle 340 may vary as a function of the cross-section shape and nominal profile to be attained. Thus the guide 220 serves as a means to increase precision of the abrasive surface, by remaining in contact with the base material. Because of its varying shape with respect to the abrasive surface, the guide 220 provides a variety of possible angles 340 to obtain a level of precision as never before attained.

Positioning of the guide 220, and the specific angle 340 which corresponds to a specific contact point of the guide with respect to the abrasive surface 210 allows the guidance of the abrasive surface 210 along the abrasive direction 350 or 352. The angle 340 ensures that only the exceeding added material 302 is removed, and that the abrasive surface 210 is prevented from getting into contact with the base material 305, as when all the exceeding added material 302 is removed, pressure on the guide 220 prevents the abrasive surface 210 to get in contact with the base material of the manufactured component 300. Alternatively, as the guide 220 precisely guides removal of the added exceeding material to correspond to the nominal profile, the guide 220 may further be in contact with added material which corresponds to the nominal profile. Although the angle 340 is shown as static on the example of FIG. 5C, those skilled in the art will understand that the value of the angle 340 may vary during the blending operation, to adapt to the surface of the manufactured component 300, and the exceeding added material 302 to be removed.

FIG. 3D represents a cross-section view of the manufactured component 300, the abrasive surface 210 and the guide 220 where the abrasive surface 210 and the guide 220 have been moved along a trajectory following the abrasion direction 350 or 352 with respect to the manufactured component 300. Since the profile of the manufactured component 300 is linear, the angle 340 and the contact point 320 of the guide 220 with the manufactured component 300 are the same along the trajectory, it will be illustrated later in the description that the angle 340 and contact point 320 are modified along a trajectory following an abrasion direction 350 with respect to a manufactured component 300 with a nominal profile not linear.

The positioning mechanism controls the relative position and angle of the manufactured component and the abrasive surface 210 and guide 220. The positioning mechanism may include for example a servo motor or any other positioning mechanism known in the industry. In the context of the present apparatus and method, the positioning mechanism further ensures that a particular contact point of the guide(s) 220 is in contact with a particular position of the manufactured component corresponding to the nominal profile of the manufactured component, either being the base material or added material that has been blended and corresponds to the nominal profile.

Now referring to FIGS. 3 and 5B-D concurrently, a method for blending added material with base material on a manufactured component will be described.

The method comprises determining a trajectory of an abrasive surface 210 of an abrasive device with respect to a manufactured component 300. For instance, as illustrated in FIGS. 5C and 5D, the manufactured component 300, the abrasive surface 210 and the guide 220 are moved with respect to one another according to an abrasion direction 350 or 352, in order to remove exceeding added material 302 from the manufacturing component 300. Either the manufacturing component 300 is moved opposite to the abrasion direction 350 or 352, or the abrasive surface 210 and the guide 220 are moved along the abrasion direction 350 or 352, or both the manufacturing component 300, the abrasive surface 210 and the guide 220 are moved in opposite direction to one another.

The method comprises determining which of a plurality of contact points of at least one guide 220 is to be kept in contact with the manufactured component 300 at each position along the trajectory. The determining may be performed by means of a processor, an algorithm taking into consideration profile of the manufactured component 300 (obtained by any means known in the art such as cameras, infrared, optical measurement systems, etc.) the nominal profile of the component, and the guide 220. The determined contact point ensures a precise guidance of the abrasive surface 210 by the guide 220 along the trajectory. For instance, as illustrated in FIGS. 5C and 5D, the contact point 320 of the guide 220 with the manufactured component 300 ensures the proper guidance of the abrasive surface 210 along the trajectory defined by the abrasion direction 350 or 352, in order to remove the exceeding added material 302 from the manufactured component 300.

The method comprises actuating the abrasive device. For example, as illustrated in FIG. 5B, the abrasive surface 210 may be set in an abrasive motion 300 with respect to the abrasive direction 350 or 352.

The method comprises controlling position and angle of the abrasive surface 210 and a contact point of the guide 220 on the manufactured component 300 along the trajectory. The controlling of the position and angle may be performed by using a robotic arm holding the component 302, holding the abrasive device 200 or two robotic arms each holding one of the component 302 and the abrasive device 200. For instance, as illustrated in FIGS. 5C and 5D, at each step of the trajectory, a specific angle 340 determines an orientation of the abrasive surface 210 with respect to the manufactured component 300 to maintain a specific contact point of the guide 220 in contact with the manufactured component 300. The combination of the angle 340 and the position of the contact point 320 on the manufactured component 300 determines the position and orientation of the abrasive surface 210 with respect to the manufactured component 300 along the trajectory.

Bleeding Process for a Manufactured Component with a Convex Profile

Referring to FIGS. 6A-D concurrently, the control of the position and angle of the abrasive surface and the guide with respect to the manufactured component is illustrated in the case of a manufactured component with a convex cross-section, in this case, the position and angle need to be modified along the trajectory to allow proper removal of exceeding added material.

FIG. 6A represents a cross-sectional view of a manufactured component 400 with a convex profile, comprising base material 401, added material 403, and exceeding added material 402. The exceeding added material 402 has to be removed, and the added material 403 blended with the base material 401 for the manufactured component 400 to correspond to its nominal profile.

FIG. 6B represents a cross-sectional view of the manufactured component 400, the abrasive surface 210 and the guide 220. The guide 220 is fixed to the abrasive device (not represented in FIG. 6B) comprising the abrasive surface 210. The manufactured component 400 comprises the exceeding added material 402 and base material 405. The added material 403 has been shown as part of the base material 401 for clarification purposes. The abrasive surface 210 may move along an upward trajectory 450, or a normal trajectory 352. The abrasive surface 210 may be positioned as shown on FIG. 6B with respect to the manufactured component 400, or be pivoted by counter-clockwise 90° with respect to a normal plane of FIG. 6B. More particularly, the abrasive surface and the guide 220 are positioned with respect to the manufactured component 400 in such a manner as to efficiently use the precision provided by the guide 220 when it is in contact with the base material 405, or with added material which has been blended with the base material 405 and respect the nominal profile. When such a configuration is respected, the abrasive surface 210 removes the exceeding added material 402, without removing the base material 405. Furthermore, the position of the abrasive surface 210 and the guide 220 with respect to the manufactured component 400 allows removing the exceeding added material 402 without removing any base material, and with a precision greater than without the use of the guide 220.

The positioning mechanism (not represented in FIG. 6B) controls the position and angle 440 of the abrasive surface 210 and the guide 220 with respect to the manufactured component 400. In operation, the positioning mechanism guides the abrasive surface 210 along the abrasion direction 450 or 352 while maintaining a contact point 420 of the guide 220 either aft, parallel or forward of the abrasion direction 430 and in contact with the manufactured component 400. The specific angle 440 allows the guidance of the abrasive surface 210 along the abrasive direction 450 end simultaneously the maintenance of the contact point 420 of the guide 220 in contact with the manufactured component 400. The angle 440 is furthermore adapted if required upon displacement of the abrasive surface 210 on the manufactured component 400, so as to adjust to any change in the trajectory (either concave or convex trajectory), and to efficiently remove the added exceeding material 402. For example, the positioning mechanism may keep the abrasive surface 420 to remove added exceeding material, and gradually change the angle 440, and in consequence the contact point on the guide 420, so as to remove a greater quantity and in a gradual manner of added exceeding material 402.

Figure 6C:
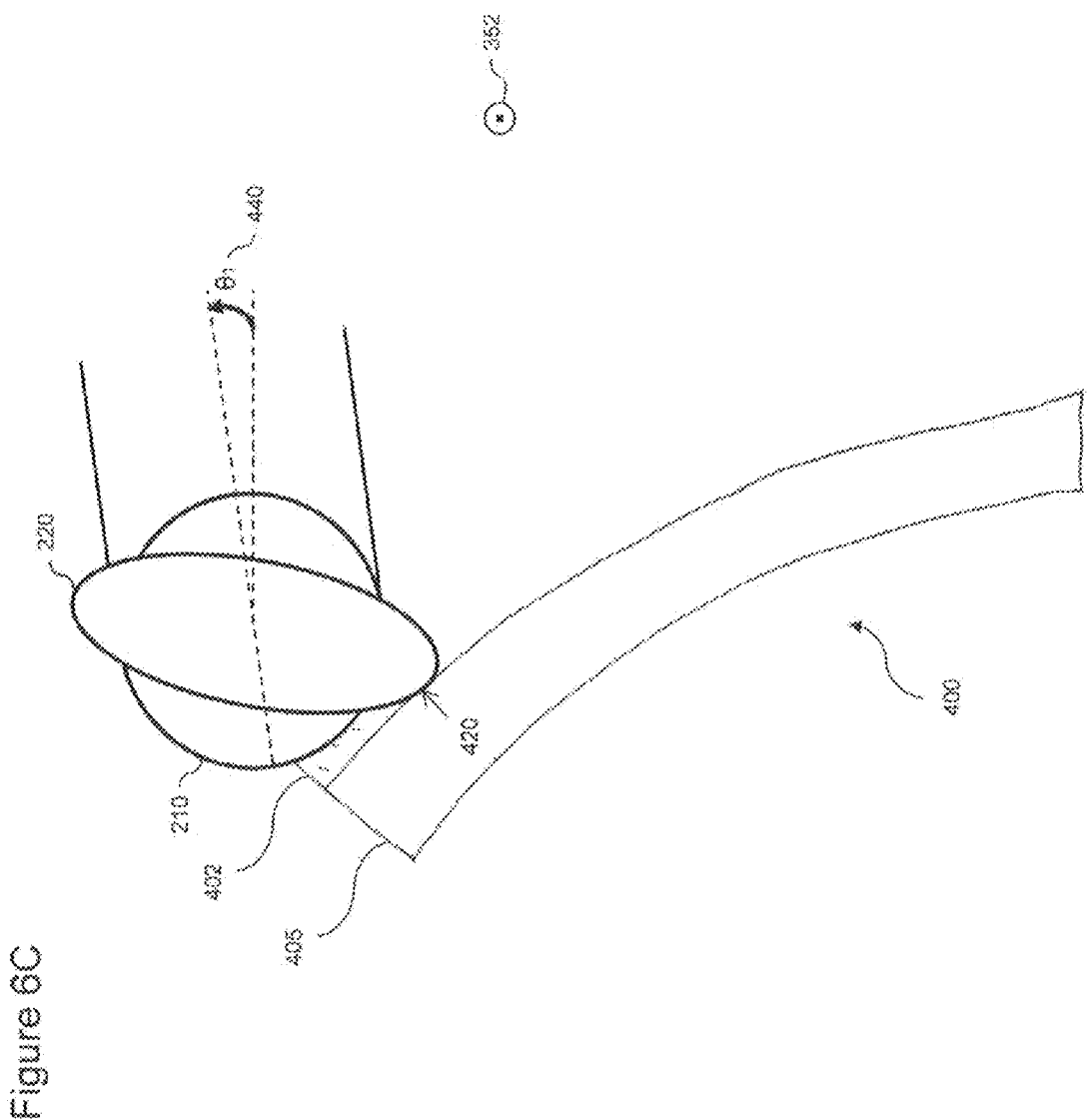

FIG. 6C represents a cross-sectional view of the manufactured component 400, the abrasive surface 210 and the guide 220, where the abrasive surface 210 and the guide 220. The angle 440 and the contact point 420 of the guide 220 with the manufactured component 400 result in the abrasive surface 210 being in contact with the added exceeding material but not removing all the added exceeding material. To precisely remove all the added exceeding material, the angle 440 has to be modified, which in turn will affect the point of contact 420 of the guide 220 on the manufactured component.

FIG. 6D represents a cross-sectional view of the manufacture component 400, the abrasive surface 210 and the guide 220, where the angle 441 and the contact point 421 of the guide 220 with the manufactured component 400 have been/adapted, to provide proper guidance of the abrasive surface 210 and precise abrasion of the exceeding added material 402. In particular, with the angle 441 and the contact point 421, the abrasive surface 210 is in contact with the nominal profile of the manufactured component, for complete removal of the exceeding added material 402.

Although the abrasive surface and the guide have been shown as being tangent of the cross-section of the manufactured component, the present method and apparatus are net limited to such a configuration. The abrasive surface and the guide may be positioned in any suitable direction, which allows abrasion of added exceeding material, while positioning one point of the guide on the base material or on added material which corresponds to the nominal profile of the manufactured component.

The positioning mechanism is thus capable of adapting the position and angle of the abrasive surface 210 and the guide 220 with respect to the manufactured component 400 in real time, while the abrasive surface 210 and the guide 220 are moved along the trajectory following the abrasion direction 450 with respect to the manufactured component 400. The blending of the added material 403 with the base material 401 is performed in a single iteration, by precise removal of the exceeding added material 402.

In another embodiment, the positioning mechanism may not be capable of adapting the position and angle of the abrasive surface 210 and the guide 220 with respect to the manufactured component 400 in real time. In this case, the blending of the added material 403 with the base material 401 may be performed in several iterations, by gradual removal of the exceeding added material 402.

Referring to FIGS. 7A-B and 6B concurrently, two iterations of the blending process are illustrated. In a first iteration represented in FIG. 7A, a first position and a first angle of the abrasive surface 210 and the guide 220 with respect to the manufactured component 400 is selected as illustrated in FIG. 6B. A first trajectory of the abrasive surface 210 may be defined as a tangent 455 to the nominal profile of the base material, at a starting point 415. The first position and angle of the abrasive surface 210 and the point of contact on the guide 220 are selected such that all the exceeding added material 402 on the right side of the first tangent 455 is removed when the abrasive surface 210 follows the trajectory along the tangent 455. Following the first iteration, the blending process is completed from the starting point 415 to a second point 416.

In a second iteration represented in FIG. 7B, a second position and a second angle of the abrasive surface 210 and the point of contact on the guide 220 with respect to the manufactured component 400 is selected. A second trajectory of the abrasive surface 210 corresponds to a second tangent 456, at the second point 416. The second position and angle of the abrasive surface 210 and the guide 220 are selected such that all the exceeding added material 402 on the right side of the second tangent 456 is removed when the abrasive surface 210 using the guide at the selected contact point follows the second trajectory along the second tangent 456. Following the second iteration, the blending process is completed from the second point 416 to a third point 417.

This process may be repeated for as many iterations as necessary to remove all the exceeding added material 402. At each iteration, the trajectory of the abrasive surface 210 may define a tangent. The position and angle of the abrasive surface 210 and the point of contact of the guide 220 is selected to ensure proper guidance of the abrasive surface 210 along the trajectory. The number of iterations is dependent on many factors: the nominal profile to be achieved, the efficiency of the abrasive surface, the relative size of the abrasive surface with respect to the added exceeding material to be removed, the number of guides used, etc.

Blending Process for a Manufactured Component with a Concave Profile

Figure 8A:
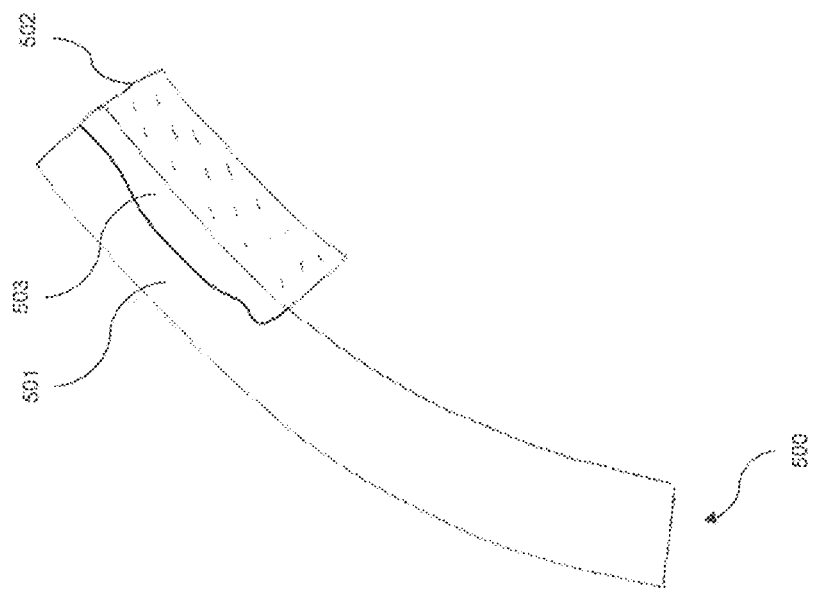
FIGS. 8A-D illustrate a blending operation of a manufactured component with a concave profile, according to a non-restrictive illustrative embodiment.

Referring to FIGS. 8A-D concurrently, the control of the position and angle of the abrasive surface end the point of contact of the guide with respect to the manufactured component is illustrated in the case of a manufactured component with a concave cross-section. Although the abrasive surface 210 and the guide 220 are shown in a particular position with respect to the manufactured component, the abrasive surface 210 and the guide 220 could be pivoted in many direction, and following various trajectories, as long as the guide 220 may be in contact with base material or blended material, to guide the abrasive surface therefrom FIG. 8A represents a cross-sectional view of a manufactured component 500 with a concave profile, comprising base material 501, added material 503, and exceeding added material 502. The exceeding added material 502 is removed, and the added material 503 is blended with the base material 501, either following the trajectory 550, of following a trajectory 352 which is normal to the cross-sectional view and for which the abrasive surface 210 and the guide 220 have to foe rotated 90° clockwise with respect to the normal trajectory 352.

Figure 8B:
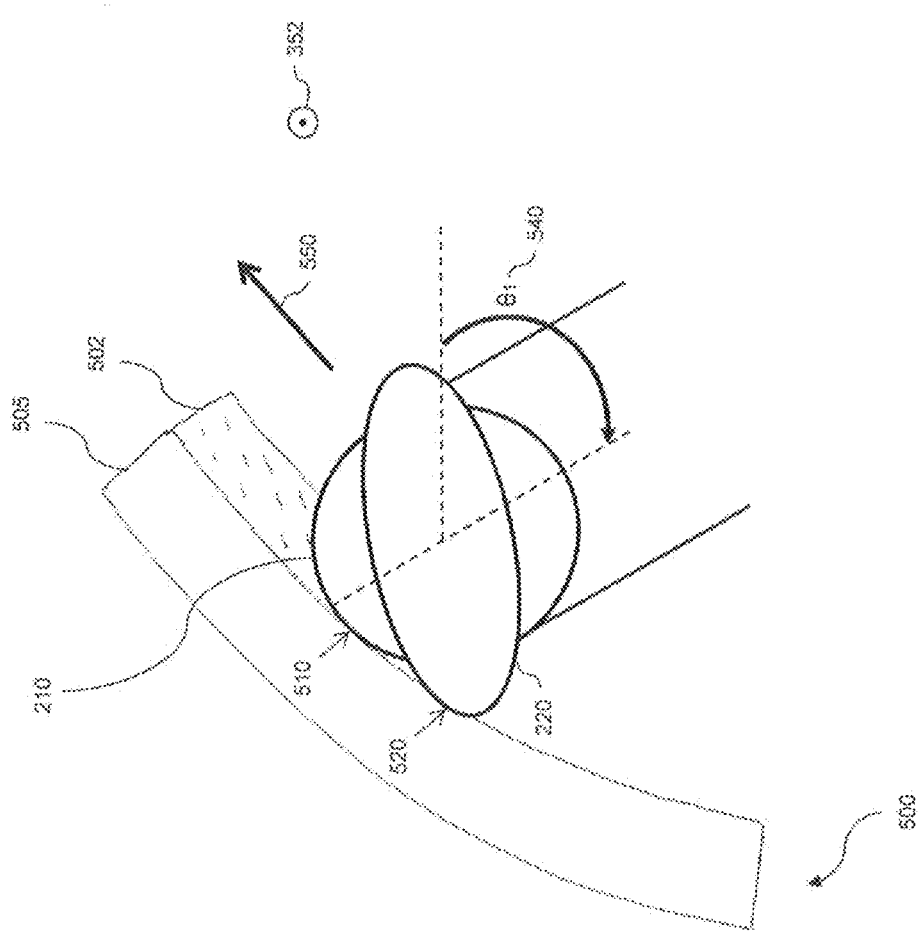

FIG. 8B represents a cross-sectional view of the manufactured component 500, the abrasive surface 210 and the guide 220. The guide 220 is fixed to the abrasive device (not represented in FIG. 8B) comprising the abrasive surface 210. The manufactured component 500 comprises the exceeding added material 502 and base material 505. The base material 505 of FIG. 8B comprises the base material 501 and the added material 503 blended with the base material 501 represented in FIG. 3A. The abrasive surface 210 removes the exceeding added material 502, without removing the base material 505. For this purpose, the abrasive surface 210 performs an abrasive motion (not represented in FIG. 8B) for removing the exceeding material 502. And the position of the abrasive surface 210 with respect to the manufactured component 500 follows an abrasion direction 550 for precisely removing the exceeding added material 502 without removing the base material 505.

The positioning mechanism (not represented in FIG. 8B) controls the position and angle 540 of the abrasive surface 210 end the point of contact of the guide 220 with respect to the manufactured component 500. In operation, the positioning mechanism guides the abrasive surface 210 along the abrasion direction 550 or 352 (depending on the position of the abrasive surface and the guide with respect to the manufactured component, while, maintaining a contact point 520 of the guide 220 in contact with the base material 505 (or blended added material) of the manufactured component 500. The specific angle 540 allows the guidance of the abrasive surface 210 along the abrasive direction 550 or 352 and simultaneously maintaining the contact point 520 of the guide 220 in contact with the base material 505 of the manufactured component 500. The position and angle 540 of the abrasive surface 210 and the point of contact of the guide 220 with respect to the manufactured component 500 allows the abrasive surface 210 to remove the exceeding added material 502 without removing any base material 505 or previously blended added material.

Figure 8C:
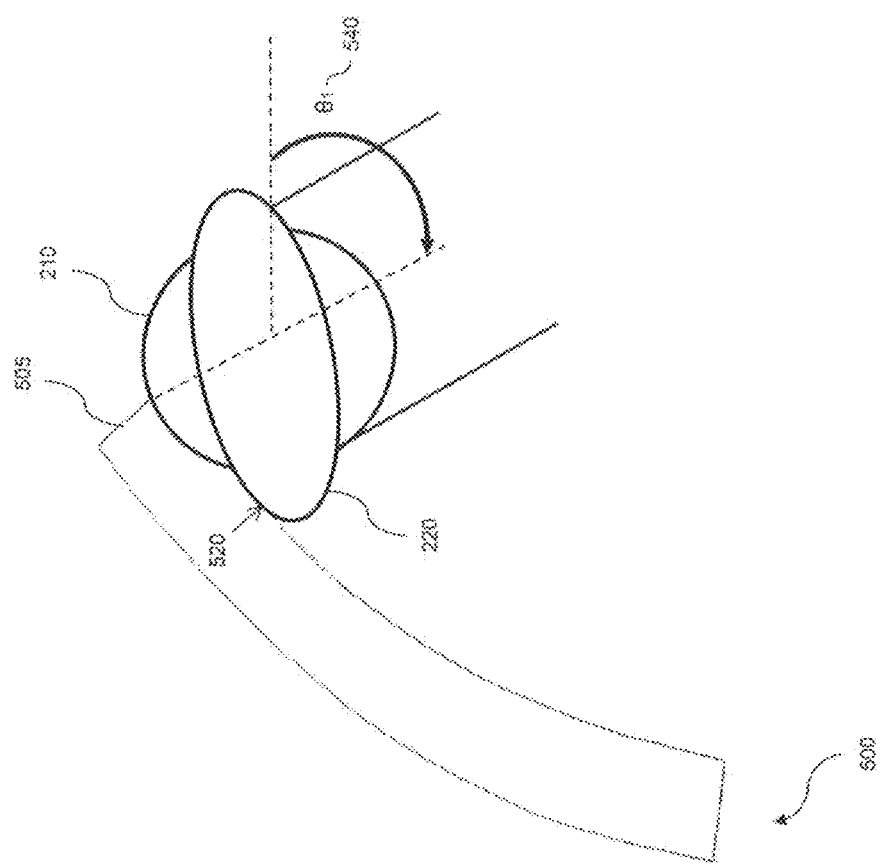

FIG. 8C represents a cross-section view of the manufactured component 500, the abrasive surface 210 and the guide 220, where the abrasive surface 210 and the point of contact of the guide 220 have been moved along the trajectory following the abrasion direction 550 with respect to the manufactured component 500 of FIG. 8B, and where the angle 540 and the contact point 520 of the guide 220 with the manufactured component 500 have been kept constant. Since the profile of the manufactured component 500 is concave, the abrasive surface 210 would remove the base material 505 if the angle 540 is not adapted to more precisely guide the abrasive surface with respect to the nominal profile and the base material. It is thus necessary to adapt the position and angle of the abrasive surface 210 and the point of contact of the guide 220 with respect to the nominal profile of the manufactured component 500 along the trajectory so as to provide precise removal of the added exceeding, material, and prevent removal of any base material or added material corresponding to the nominal profile.

Figure 8D:
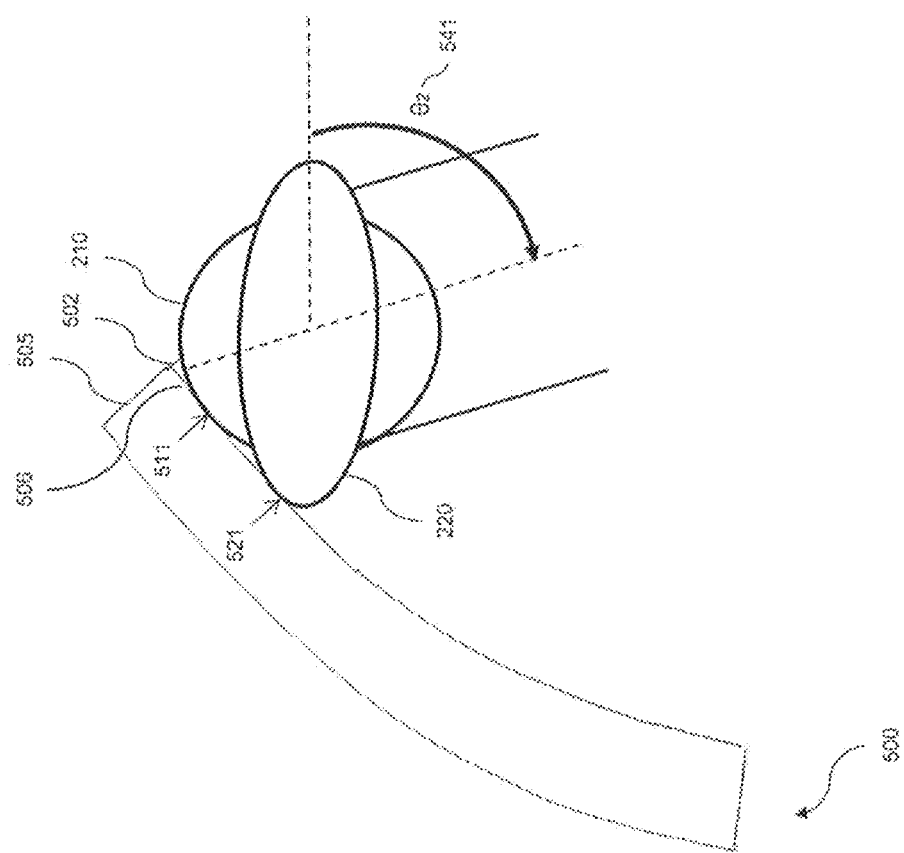

FIG. 8D represents a cross-sectional view of the manufactured component 500, the abrasive surface 210 and the guide 220, where the abrasive surface 210 and the guide 220 have been moved along the trajectory at the same step as the one illustrated in FIG. 8C. However, the angle 541 and the contact point 521 of the guide 220 with the manufactured component 500 have been adapted, to provide proper guidance of the abrasive surface 210 and the proper removal of the exceeding added material 502. In particular, with the angle 541 and the contact point 521, the abrasive surface 210 is in contact with the border 506 at a contact point 511, for complete removal of the exceeding added material 502.

As already explained with respect to the manufactured component 400 with the convex profile, the blending process may be performed in a single iteration. In this case, the positioning mechanism adapts the position and angle of the abrasive surface 210 and the point of contact of the guide 220 with respect to the manufactured component 500 in real time, while the abrasive surface 210 and the guide 220 are moved along the trajectory following the abrasion direction in accordance with the nominal profile of the manufactured component 500. Alternatively, the blending process may be performed in several iterations, in this case, the positioning mechanism may adapt the position and angle of the abrasive surface 210 and the point of contact of the guide 220 with respect to the nominal profile of the manufactured component 500 iteratively. During a specific iteration, the position and angle are maintained while the abrasive surface 210 and the guide 220 are moved along a specific trajectory (determined for the specific, iteration).

Force Control Mechanism

Although the determination of the trajectory of the abrasive surface of the abrasive device with respect to the manufactured component, as well as the determination of the position and angle of the abrasive surface and the point of contact on the guide with respect to the manufactured component along the trajectory, are performed with a high level of precision, the blending process is prone to various types of errors.

For example, the trajectory may be implemented by a robot moving the manufactured component with respect to the abrasive surface and guide according to the trajectory. Alternatively, a robot may be moving the abrasive surface and guide with respect to the manufactured component according to the trajectory. In both cases, the movement of the robot may not perfectly respect the trajectory, introducing some error in the blending process.

Since the blending process is submitted to very tight requirements (no or almost no base material shall foe removed depending of the requirements, all or almost all the exceeding added material shall be removed depending of the customer requirement), a force control mechanism may be used to compensate the aforementioned errors. The force control mechanism applies a force to the abrasive device when the abrasive surface is in contact with the manufactured component, to allow the abrasive surface to remove the exceeding added material or on the point of contact of the guide when all added exceeding material has been removed. The force is transferred from the abrasive device to the point of contact of the guide to prevent the abrasive surface from removing more material that required.

Additionally, a force sensor may be used to control the force applied by the force control mechanism. The force sensor measures the force applied to the abrasive device. The force sensor compares the measured force to a predetermined value corresponding to a force applied to the abrasive device when the abrasive surface or the guide is in contact with the base material. When the added exceeding material is removed, the force will be transferred from the abrasive device to the guide Force control mechanisms (for alternatively applying a force to the abrasive device and to the guide) and force sensors (for measuring the force applied to the abrasive device) are well known in the art. Such known force control mechanisms and force sensors may be used in the context of the present disclosure (by example 6 degrees of freedom sensor can be used on a robot to adapt is path to respect the required force or moment).

Calculation of the Trajectory

In an embodiment of the present disclosure, the trajectory of the abrasive surface of the abrasive device with respect to the manufactured component is calculated by a computer. The calculation of the trajectory comprises the determination of a path of the abrasive surface with respect to the manufactured component along the abrasion direction. The calculation of the trajectory also comprises the determination of the position and angle of the abrasive surface and the point of contact of the guide with respect to the manufactured component along the path following the abrasion direction. The calculation of the trajectory also comprises the determination of which of the plurality of contact points of the guide is in contact with the manufactured component along the path foil owing the abrasion direction. The trajectory may be calculated by processing a 3D model of the manufactured component, the 3D model comprising a representation of the added material and the base material.

Using the calculated trajectory, a robot may move the manufactured component with respect to the abrasive surface of the abrasive device according to the determined path. Alternatively, a robot may move the abrasive device with respect to the manufactured component according to the determined path. And the positioning mechanism controls the position and angle of the abrasive surface and the point of contact of the guide with respect to the manufactured component using the determined position end angle along, the determined path.

The calculation of the trajectory, may be performed in two steps. In a first step, the trajectory is calculated for the abrasive surface of the abrasive device without the presence of the guide. The first step is illustrated in FIG. 4B. The trajectory comprises the path 160 of the abrasive surface 110 with respect to the manufactured component 150. For each point of the path 160, the position and angle of the abrasive surface 110 with respect to the manufactured component 150 is determined. The second step is illustrated in FIG. 4C. The trajectory is modified to take into consideration the guide 122 fixed to the abrasive device 100. For each point of the path 160, the position and angle of the abrasive surface 110 and the point of contact of the guide 122 with respect to the manufactured component 150 is determined. As illustrated, the position and angle of the abrasive surface 110 is modified by the presence of the guide 122. The new position and angle ensures that at least one of the plurality of contact points of the guide 122 is tangentially in contact with the manufactured component 150, while at the same time a contact point on the abrasive surface 122 is tangentially in contact with the manufactured component 150. As illustrated, for a given point on the path 160, the tangential contact point on the abrasive surface 122 is different without the presence of the guide 122 (FIG. 4B) and with the presence of the guide 122 (FIG. 4C).

System for Performing the Blending Process

Figure 9:
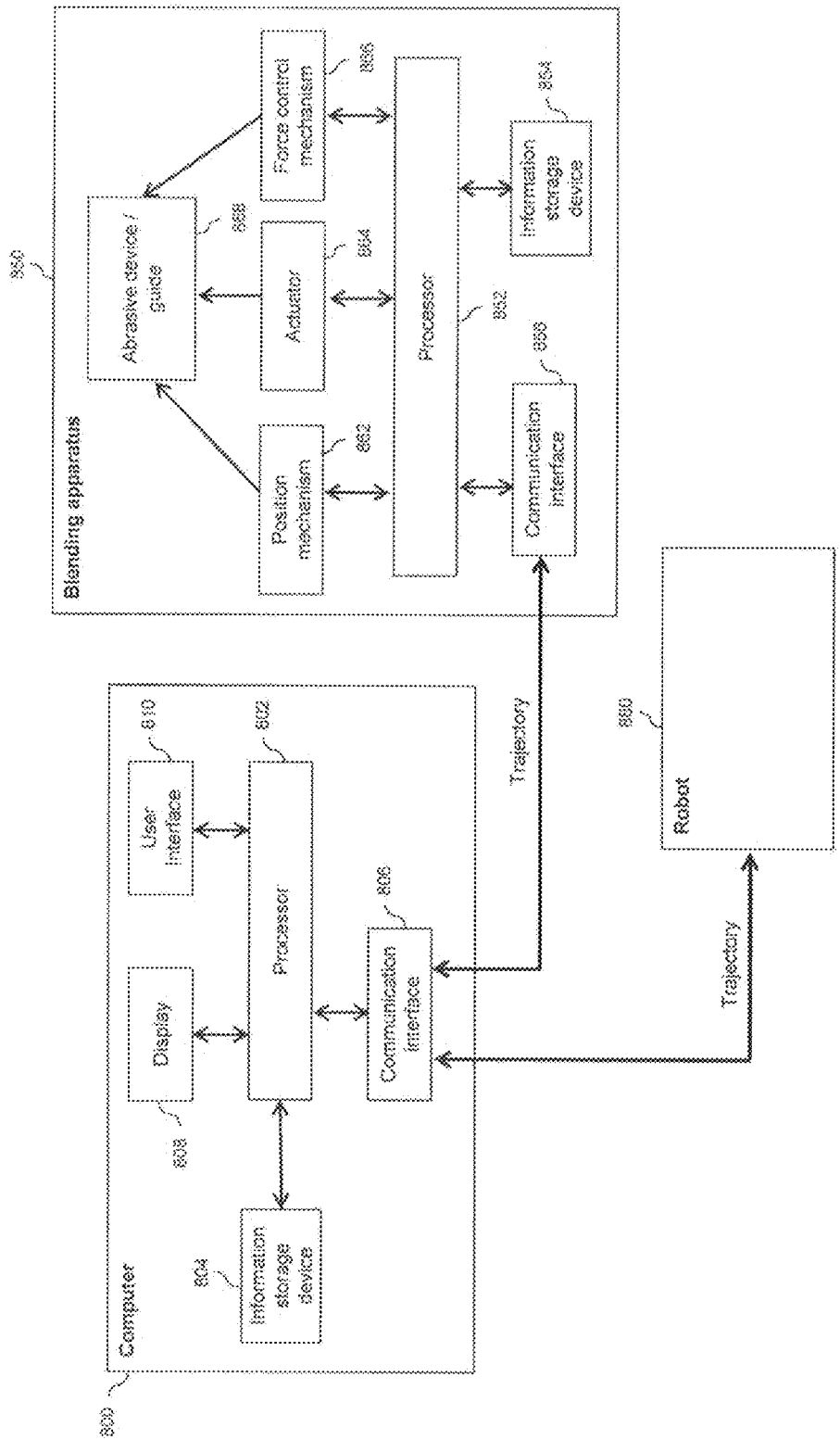
FIG. 9 illustrates a system for blending added material with base material on a manufactured component, according to a non-restrictive illustrative embodiment.

FIG. 9 illustrates a system for performing the blending process. The system comprises a computer 800 for calculating the trajectory and a blending apparatus 850 for performing the blending process using the calculated trajectory.

The computer 800 comprises a processor 802 for calculating the trajectory based on a 3D model of the manufactured component stored in an Information storage device 804, also referred as the nominal profile. A user may control the calculation of the trajectory by the processor 802 via a display 808 and a user interface 810. The computer 800 also includes a communication interfuse 806, for transmitting the trajectory to the blending apparatus 850.

The blending apparatus 850 includes a communication interface 858 for receiving the trajectory from the computer 800, an information storage device 854 for storing the trajectory, and a processor 652 for processing the trajectory and generating commands to positioning mechanism including an orientation mechanism 862, an actuator 864, and a force control mechanism 866. The blending apparatus 850 further comprises an abrasive device/guide 868 (the guide is fixed to the abrasive device and the abrasive device comprises an abrasive surface not represented). As previously mentioned in the description, the position mechanism controls a position and angle of the abrasive device/guide 868, according to the trajectory. The actuator 864 controls an abrasive motion of the abrasive surface of the abrasive device 868 (e.g. a rotational speed of the abrasive surface may be varied according to the trajectory). The force control mechanism 856 controls a force applied to the abrasive device/guide 868. The force control mechanism 856 may be coupled with a force sensor (not represented), as previously mentioned in the description.

The system may also comprise a robot 880. The robot 880 receives the trajectory from the computer 800. In one embodiment, the robot 880 performs a movement of a manufactured component, with respect to the blending apparatus 850 along a path following an abrasion direction determined by the trajectory. In another embodiment, the robot 880 performs a movement of the blending apparatus 850 with respect to a manufactured component along a path following an abrasion direction determined by the trajectory. In this embodiment, the robot 880 and the blending apparatus 850 may be integrated in a single apparatus.

In another particular aspect, the positioning mechanism takes into consideration operational parameters for controlling the position and angle of the abrasive surface with respect to the manufactured component. The operational parameters may include a wear of the abrasive surface. For example, the thickness of the abrasive surface may be reduced by wear. Thus, an operational profile (with wear) of the abrasive surface is taken into consideration, instead on an ideal profile (without wear), to determine at which position and angle the abrasive surface is in contact with the exceeding added material on the manufactured component. The operational parameters may also include specific characteristics of the manufactured component.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An apparatus for blending added material with base material on a manufactured component, the apparatus comprising:

an abrasive device having an abrasive surface for removing exceeding added material and blending the added material with the base material, the abrasive surface performing in operation an abrasive motion, the abrasive surface defining a substantially circular shape along an extremity of the abrasive device;

a guide fixed to perpendicular to the abrasive surface and providing a plurality of contact points exceeding at least a portion of the abrasive surface, the guide having a substantially elliptical shape defining a center, the center of the guide being positioned at a center of the circular shape of the abrasive surface; and a positioning mechanism for controlling position and angle of the abrasive surface and a point of contact of the guide with respect to the manufactured component, the positioning mechanism guiding in operation the abrasive surface along an abrasion direction while maintaining at least one of the plurality of contact points of the guide in contact with the manufactured component.

2. The apparatus of claim 1, wherein the added material consists in welded material.

3. The apparatus of claim 1, wherein the abrasive motion is opposite to the abrasion direction.

4. The apparatus of claim 1, wherein the manufactured component is moved with respect to the abrasive device in the abrasion direction.

5. The apparatus of claim 1 further comprising a force control mechanism for:
- applying a force to the abrasive device when the abrasive surface is in contact with the manufactured component, to allow the abrasive surface to remove the exceeding added material; and
- transferring the force from the abrasive device to the point of contact of the guide when the abrasive surface is in contact with the base material, to prevent the abrasive surface from removing the base material.

6. The apparatus of claim 5 further comprising a force sensor for:
- measuring the force applied to the abrasive device;
- comparing the measured force to a predetermined value corresponding to a force applied to the abrasive device when the abrasive surface and the guide are in contact with the base material; and
- triggering a transfer of the force from the abrasive device and the guide when the measured force is equal to the predetermined value.

7. The apparatus of claim 1, wherein the positioning mechanism takes into consideration operational parameters for controlling the position and angle of the abrasive surface, the operational parameters including a wear of the abrasive surface, and specific characteristics of the manufactured component.

8. The apparatus of claim 1, wherein a trajectory of the abrasive surface with respect to the manufactured component is calculated by a computer, calculation of the trajectory comprising: determining the position and angle of the abrasive surface, and determining which of the plurality of contact points are to be kept in contact with the manufactured component.

9. The apparatus of claim 8, wherein the trajectory is calculated by processing a 3D model of the manufactured component, the 3D model comprising a representation of the added material and the base material.

10. The apparatus of claim 1, wherein the abrasive surface is a sand belt.

11. The apparatus of claim 1, wherein the manufactured component consists in a blade.

* * * * *